United States Patent
Mese et al.

(10) Patent No.: US 11,303,718 B2
(45) Date of Patent: Apr. 12, 2022

(54) METHOD AND DEVICE TO MANAGE TEMPORARY CONTENT ON A MOBILE DEVICE

(71) Applicant: Lenovo (Singapore) Pte. Ltd., Singapore (SG)

(72) Inventors: John Carl Mese, Cary, NC (US); Nathan J. Peterson, Durham, NC (US); Russell Speight VanBlon, Raleigh, NC (US); Arnold S. Weksler, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 513 days.

(21) Appl. No.: 14/296,940

(22) Filed: Jun. 5, 2014

(65) Prior Publication Data
US 2015/0358420 A1 Dec. 10, 2015

(51) Int. Cl.
| | |
|---|---|
| *H04L 67/5682* | (2022.01) |
| *H04L 67/1097* | (2022.01) |
| *H04L 67/52* | (2022.01) |
| *G06F 3/04842* | (2022.01) |
| *G06F 3/04847* | (2022.01) |
| *H04L 67/10* | (2022.01) |

(52) U.S. Cl.
CPC ...... *H04L 67/2852* (2013.01); *G06F 3/04842* (2013.01); *G06F 3/04847* (2013.01); *H04L 67/10* (2013.01); *H04L 67/1097* (2013.01); *H04L 67/18* (2013.01)

(58) Field of Classification Search
CPC .. G06F 3/048; G06F 3/04842; G06F 3/04847; H04L 67/10; H04L 67/1097; H04L 67/18; H04L 67/2852
See application file for complete search history.

(56) References Cited

U.S. PATENT DOCUMENTS

| | | | |
|---|---|---|---|
| 7,401,194 B2 * | 7/2008 | Jewell | G06F 11/1464 707/999.202 |
| 8,438,287 B2 | 5/2013 | Liu et al. | |
| 8,447,801 B1 * | 5/2013 | Roche | H04L 67/306 707/736 |

(Continued)

FOREIGN PATENT DOCUMENTS

| | | |
|---|---|---|
| CN | 101673295 A | 3/2010 |
| CN | 103595755 A | 2/2014 |

OTHER PUBLICATIONS

CN Office Action for corresponding CN Application No. 201510158383 dated Feb. 1, 2018 (9 pages).

*Primary Examiner* — Justin R. Blaufeld
(74) *Attorney, Agent, or Firm* — The Small Patent Law Group LLC; Dean D. Small

(57) ABSTRACT

Methods, devices and program products are provided for collecting content at a mobile device, and receiving, through a user interface of the mobile device, an indicator designating at least a portion of the content to represent temporary content. The methods, devices and program products store the content in a local storage medium local to the mobile device, and delete the temporary content, from the local storage medium, based on the indicator. The methods, devices and program products may prevent transfer, of the temporary content, from the local storage medium to a remote storage medium based on the indicator.

24 Claims, 5 Drawing Sheets

(56) References Cited

U.S. PATENT DOCUMENTS

| | | | |
|---|---|---|---|
| 8,903,777 B1* | 12/2014 | Searls | G06F 17/3007 707/665 |
| 9,692,822 B1* | 6/2017 | Cheshire | H04L 67/1095 |
| 2002/0083184 A1* | 6/2002 | Elliott | H04L 29/06 709/232 |
| 2005/0198024 A1* | 9/2005 | Sakata | H04N 5/44543 |
| 2006/0041893 A1* | 2/2006 | Castro | H04L 67/306 719/320 |
| 2006/0074851 A1* | 4/2006 | Nagai | G06F 17/30578 |
| 2006/0079977 A1* | 4/2006 | Nagai | G06F 17/30578 700/94 |
| 2006/0106896 A1* | 5/2006 | Carlson | G06F 11/1451 |
| 2007/0025197 A1* | 2/2007 | Kinouchi | G11B 27/327 369/30.04 |
| 2007/0168516 A1* | 7/2007 | Liu | G06F 17/30578 709/226 |
| 2008/0077627 A1* | 3/2008 | Yachi | G11B 27/034 |
| 2008/0189331 A1* | 8/2008 | Lee | G06Q 10/10 |
| 2010/0017443 A1* | 1/2010 | Xie | H04L 67/1095 707/E17.007 |
| 2010/0031299 A1* | 2/2010 | Harrang | H04N 21/4104 725/80 |
| 2010/0146235 A1* | 6/2010 | Weber | G06Q 30/06 711/165 |
| 2011/0225140 A1* | 9/2011 | Wu | G06F 17/30867 707/709 |
| 2013/0227083 A1* | 8/2013 | Kim | G06F 17/30203 709/219 |
| 2013/0268743 A1 | 10/2013 | Waltermann et al. | |
| 2013/0325809 A1* | 12/2013 | Kim | G06F 11/1451 707/640 |
| 2014/0047350 A1* | 2/2014 | Kim | G06F 3/0482 715/739 |
| 2014/0047560 A1* | 2/2014 | Meyer | G06F 21/62 726/28 |
| 2014/0074783 A1 | 3/2014 | Alsina et al. | |
| 2014/0081933 A1* | 3/2014 | Uhrhane | G06F 17/3023 707/695 |
| 2014/0082167 A1 | 3/2014 | Robinson et al. | |
| 2014/0115114 A1* | 4/2014 | Garmark | H04L 65/60 709/219 |
| 2014/0122447 A1 | 5/2014 | Hunter et al. | |
| 2014/0122542 A1 | 5/2014 | Barnes et al. | |
| 2014/0164547 A1* | 6/2014 | Fullagar | H04L 65/4084 709/213 |
| 2014/0258350 A1* | 9/2014 | Duval | G06F 17/30174 707/829 |
| 2014/0344739 A1* | 11/2014 | Yoon | G06F 17/30165 715/769 |
| 2015/0189359 A1* | 7/2015 | Kozuka | H04N 5/765 386/216 |
| 2015/0193514 A1* | 7/2015 | Bradshaw | G06F 17/30174 707/638 |
| 2015/0234712 A1* | 8/2015 | Fei | G06F 17/30088 707/639 |
| 2015/0310188 A1* | 10/2015 | Ford | G06F 21/10 726/28 |

* cited by examiner

METHOD AND DEVICE TO MANAGE TEMPORARY CONTENT ON A MOBILE DEVICE

BACKGROUND

Embodiments of the present disclosure generally relate to mobile device content management in connection with cloud synchronization services.

Various synchronization solutions exist that permit cloud backup of content from mobile devices to a remote network storage medium. In general, synchronization solutions utilize settings on a mobile device such that, when the mobile device connects to a wireless network (e.g., WiFi), the mobile device automatically backs up content to a remote network, such as a cloud based storage site.

However, mobile devices are used to collect various content that a user may not wish to back up to cloud storage services. For example, children may use their parents' smart phones to take pictures (e.g., selfies) that the parents do not want backed up by a synchronization service. Also, users may take photos that are only of short-term interest.

Further, users may utilize more than one backup or synchronization service. Thus, content may be backed up to one or more locations even though the content is only of interest for a short period of time.

Today, when a user wants to avoid synchronizing content (e.g., a photo) to the user's various backup services, the user turns off WiFi on the mobile device, while taking photos, and then deletes the content before resuming WiFi connectivity. Otherwise, the content is synchronized to the cloud, therefore wasting space in the user's cloud service account and disseminating content that the user may not otherwise want transferred from the mobile device.

SUMMARY

In accordance with an embodiment, a method is provided which comprises collecting content at a mobile device and receiving, through a user interface of the mobile device, an indicator designating at least a portion of the content to represent temporary content. The method also comprises storing the content in a local storage medium local to the mobile device, and deleting the temporary content, from the local storage medium, based on the indicator.

Optionally, the method includes preventing transfer, of the temporary content, from the local storage medium to a remote storage medium based on the indicator. Optionally, the method may provide content which includes multiple content elements, the indicator designating a corresponding one of the content elements to be the temporary content. A remainder of the content, other than the temporary content, represents non-temporary content. The method further comprises permitting a cloud synchronization operation in which the non-temporary content is transferred from the local storage medium to the remote storage medium.

Optionally, the method may provide an indicator which includes a lifetime marker, the method further comprising deleting the temporary content, from the local storage medium, after expiration of the lifetime marker. Optionally, the method may provide an indicator which includes a location marker, the method further comprising deleting the temporary content, from the local storage medium, based on a geographic location of the mobile device relative to the location marker.

In accordance with an embodiment, a device is provided that comprises a processor, an input that collects content, user interface, and local storage medium storing program instructions accessible by the one or more processors. The processor, responsive to execution of the program instructions, is configured to: receive, through the user interface, an indicator designating at least a portion of the content to represent temporary content; store the content in the local storage medium; and delete the temporary content, from the local storage medium, based on the indicator.

Optionally, the processor may prevent transfer, of the temporary content, from the local storage medium to a remote storage medium based on the indicator. Optionally, the device of may be configured wherein the user interface comprises one or more of the following that is selectable to enter the indicator: an input of the user interface; a trash icon on the user interface to be selected before collecting the temporary content; a content collection button on the user interface to be selected successive times; a microphone to enter a voice command; a content collection button to be held for a predetermined period of time longer than a period of time associated with collection of non-temporary content; and a touch sensitive display sensitive to a predetermined non-touch gesture associated with designation of the temporary content. Optionally, the device may be configured wherein local storage medium stores multiple content elements and indicators designating a corresponding one of the content elements to be the temporary content.

In accordance with an embodiment, a computer program product is provided, comprising a non-transitory computer readable medium having computer executable code to perform operations. The operations comprise collecting content at a mobile device, and receiving, through a user interface of the mobile device, an indicator designating at least a portion of the content to represent temporary content. The operations also comprise storing the content in a local storage medium local to the mobile device, and preventing transfer, of the temporary content, from the local storage medium to a remote storage medium based on the indicator.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
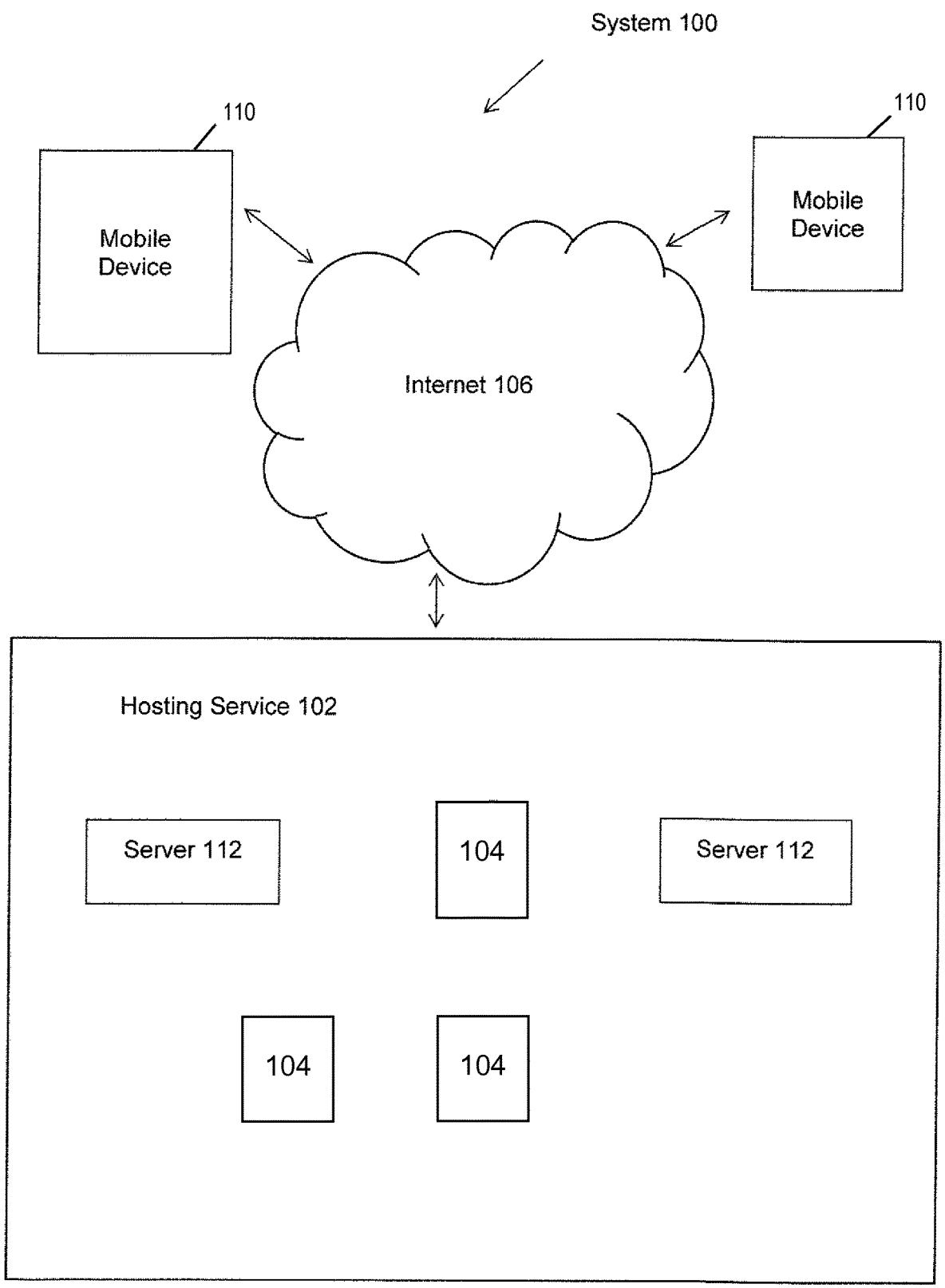
FIG. 1 illustrates a system that includes a web-based file hosting service and one or more mobile devices that communicate with the hosting service in accordance with embodiments herein.

FIG. 1 illustrates a system 100 that includes a web-based file hosting service 102 and one or more mobile devices 110 that communicate with the hosting service 102. The hosting service 102 includes one or more remote storage medium (also referred to as cloud storage) 104 that are operatively coupled to one or more servers 112. The servers 112 manage communication with mobile devices 110 in order to enable users to store and share data, files, folders and more generally content, with other mobile devices 110 over the Internet 106 using various file synchronization protocols and services. The hosting service 102 may provide content back-up, content sharing, and/or afford a user at each mobile device 110 access to content at different places. The users of the mobile devices 110 may have an account with the hosting service 102. The content may be shared with other users such as friends or colleagues. Once a file is uploaded to a shared folder on the hosting service 102, anyone with permission may be granted access to the file. For example, the hosting service 102 may represent one or more of various existing services, such as the Google Drive™ file storage and synchronization service, the Dropbox™ file storage and synchronization service, the SkyDrive™ file storage and synchronization service and the like.

Figure 2:
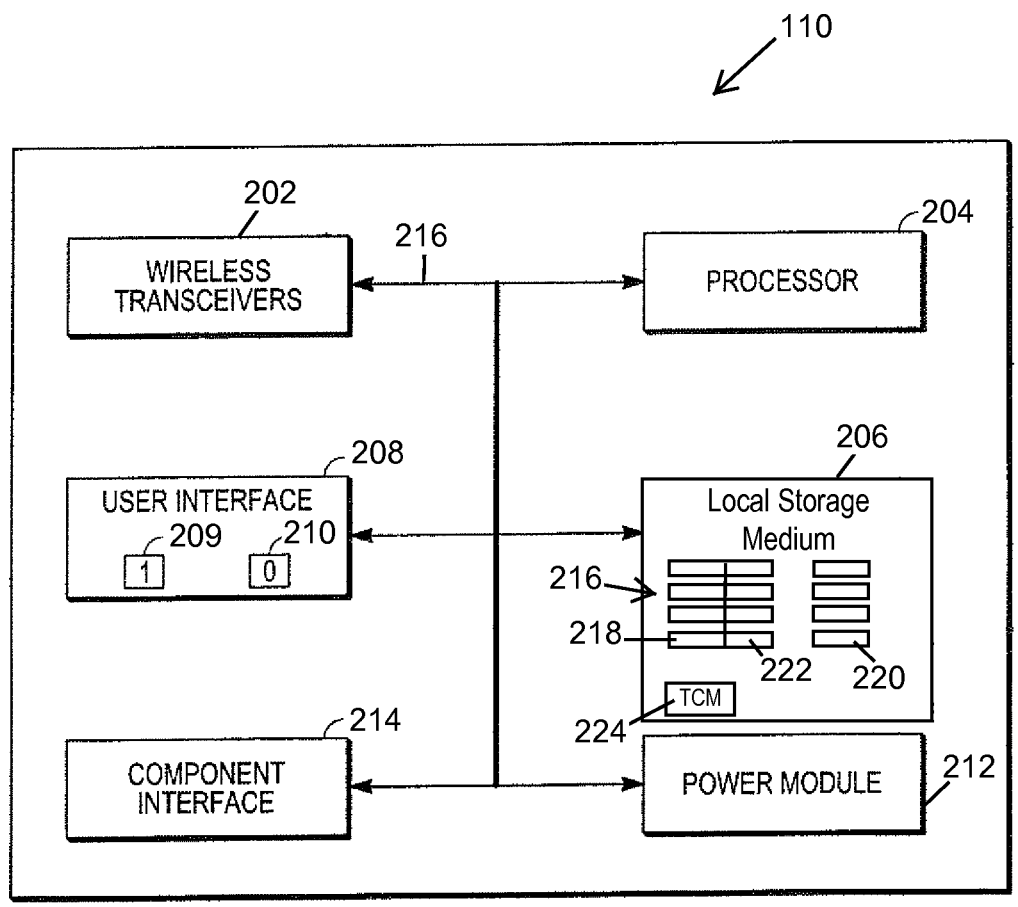
FIG. 2 illustrates a simplified block diagram of an illustrative mobile device in accordance with embodiments herein.

FIG. 2 illustrates a simplified block diagram of the mobile device 110, which includes components such as one or more wireless transceivers 202, one or more processors 204 (e.g., a microprocessor, microcomputer, application-specific integrated circuit, etc.), one or more local storage medium (also referred to as a memory portion) 206, a user interface 208 which includes one or more input devices 209 and one or more output devices 210, a power module 212, and a component interface 214. All of these components can be operatively coupled to one another, and can be in communication with one another, by way of one or more internal communication links 216, such as an internal bus.

The input and output devices 209, 210 may each include a variety of visual, audio, and/or mechanical devices. For example, the input devices 209 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 210 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 210 may include a touch sensitive screen, a non-touch sensitive screen, a text-only display, a smart phone display, an audio output (e.g., a speaker or headphone jack), and/or any combination thereof.

The user interface 208 permits the user to select one or more of a switch, button or icon to collect content elements, and/or enter indicators, including one or both of temporal and location lifetime markers. As one example, the user may enter a temporary indicator by selecting a trash soft button on the user interface before selecting a photo/video/memo capture soft button directing the mobile device 110 to take a picture, or record video/audio. As another example, the user may select a content collection button (photo/video/memo capture soft button) on the user interface 2 or more successive times, thereby instructing the mobile device 110 to both capture the content element and to mark the content element as temporary. Optionally, the user may hold down a content collection button for a predetermined period of time (e.g., 2-5 seconds, 2 or more seconds, etc.) longer than a period of time associated with collection of non-temporary content (e.g., less than 2 second).

As another example, the user may enter one or more predefined touch gestures and/or voice command through a microphone on the mobile device 110. The predefined touch gestures and/or voice command may instruct the mobile device 110 to mark a select picture, video, etc., with a temporal lifetime marker (e.g., a termination date, a period of time to maintain the temporary content element) and/or a location lifetime marker. For example, the user may provide a predefined touch gesture and/or an voice instruction to i) use a current location as a GPS based location reference information (LRI), ii) delete the content element(s) when the mobile device 110 moves a select distance from a current location or crosses a geo-fence, iii) delete the content element(s) when the mobile leaves an area services by current LANs and/or cellular towers and/or the like.

The local storage medium 206 can encompass one or more memory devices of any of a variety of forms (e.g., read only memory, random access memory, static random access memory, dynamic random access memory, etc.) and can be used by the processor 204 to store and retrieve data. The data that is stored by the local storage medium 206 can include, but need not be limited to, operating systems, applications, user collected content and informational data. Each operating system includes executable code that controls basic functions of the communication device, such as interaction among the various components, communication with external devices via the wireless transceivers 202 and/or the component interface 214, and storage and retrieval of applications and data to and from the local storage medium 206. Each application includes executable code that utilizes an operating system to provide more specific functionality for the communication devices, such as file system service and handling of protected and unprotected data stored in the local storage medium 206.

The terms "content" and "user collected content", as used throughout, shall generally refer to a collection of one or more calls, contacts, calendar, notes, and task information, text messages, email messages, and picture, audio, and video media files. The terms "content element" and "user collected content element", as used throughout, shall generally refer to an individual call, contact, calendar event, note, task, text message, email message, picture, audio recording and/or video recording.

As explained herein, the local storage medium 206 stores content 216 that includes temporary and non-temporary content elements 218 and 220 saved in common or separate memory sections. The temporary content elements 218 have identifiers 222 stored in connection therewith. As explained herein, the identifiers 222 designate at least a portion of the content 216 to represent temporary content elements 218. The identifiers may include or exclude lifetime markers designating when (or under what circumstances) the associated temporary content element 218 is to be deleted from the local storage medium 206. For example, the lifetime markers may be location-based, time-based or otherwise.

Additionally, the applications stored in the local storage medium 206 include a transient content management (TCM) application 224 for facilitating the management of content, identifiers, and operation of the mobile device 110 in order to allow a user to read, create, edit, delete, organize or otherwise manage the content or to configure mobile device settings. The TCM application 224 is preferably activated by default upon start-up of the mobile device 110, and can be activated or disabled via input devices 209 of the user interface 208. In one embodiment, the TCM application 224 may be activated when the mobile device 110 is placed in a predetermined mode. The TCM application 224 includes program instructions accessible by the one or more processors 204 to direct a processor 204 to implement the methods, processes and operations described herein including, but not limited to the methods, processes and operations illustrated in the Figures and described in connection with the Figures.

Other applications stored in the local storage medium 206 include various application program interfaces (APIs), some of which provide links to/from the cloud hosting service 102. The power module 212 preferably includes a power supply, such as a battery, for providing power to the other components while enabling the mobile device 110 to be portable, as well as circuitry providing for the battery to be recharged. The component interface 214 provides a direct connection to other devices, auxiliary components, or accessories for additional or enhanced functionality, and in particular, can include a USB port for linking to a user device with a USB cable.

Each transceiver 202 can utilize a known wireless technology for communication. Exemplary operation of the wireless transceivers 202 in conjunction with other components of the mobile device 110 may take a variety of forms and may include, for example, operation in which, upon reception of wireless signals, the components of mobile device 110 detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 210. Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals to a remote device, such as a cell tower or a remote server (not shown).

Specific reference will now be made here below to FIGS. 3-5. It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

In accordance with embodiments, there are broadly contemplated herein methods and arrangements for enabling a mobile device 110 to mark select content as temporary and to manage non-proliferation of temporary content elements to prevent proliferation into the cloud.

In accordance with embodiments, there are broadly contemplated herein methods and arrangements that provide an alternative method for capturing content, such as photos, and leveraging a user-input mechanism such as touch, gesture, voice and/or the like to switch from a default "sync photo' mode (or generally "sync content element" mode) to a "do not sync photo" mode (or generally "do not sync content element" mode). As an example, a main photo capture (soft) button may be altered or a secondary capture (soft) button may be provided proximate to the main capture button. A mode switch may be represented visually before and/or after the photo or other content is captured to denote an expected availability of the photo or other content element.

In accordance with embodiments, there are broadly contemplated herein methods and arrangements in which additional configuration options are provided to set a lifetime for the captured content and delete the content at time of expiration. In some embodiments, the methods and arrangements utilize a camera within a mobile device 110 to take a picture of some piece of information that is only of interest short-term (e.g., a photo of a location of a parked car may only persist locally for 1 or more days, a photo of WiFi credentials may only persist locally for 1 or more weeks, when playing/practicing with a select input option, when permitting children to take selfie pictures). Upon expiration of the lifetime, the picture is deleted.

Figure 3:
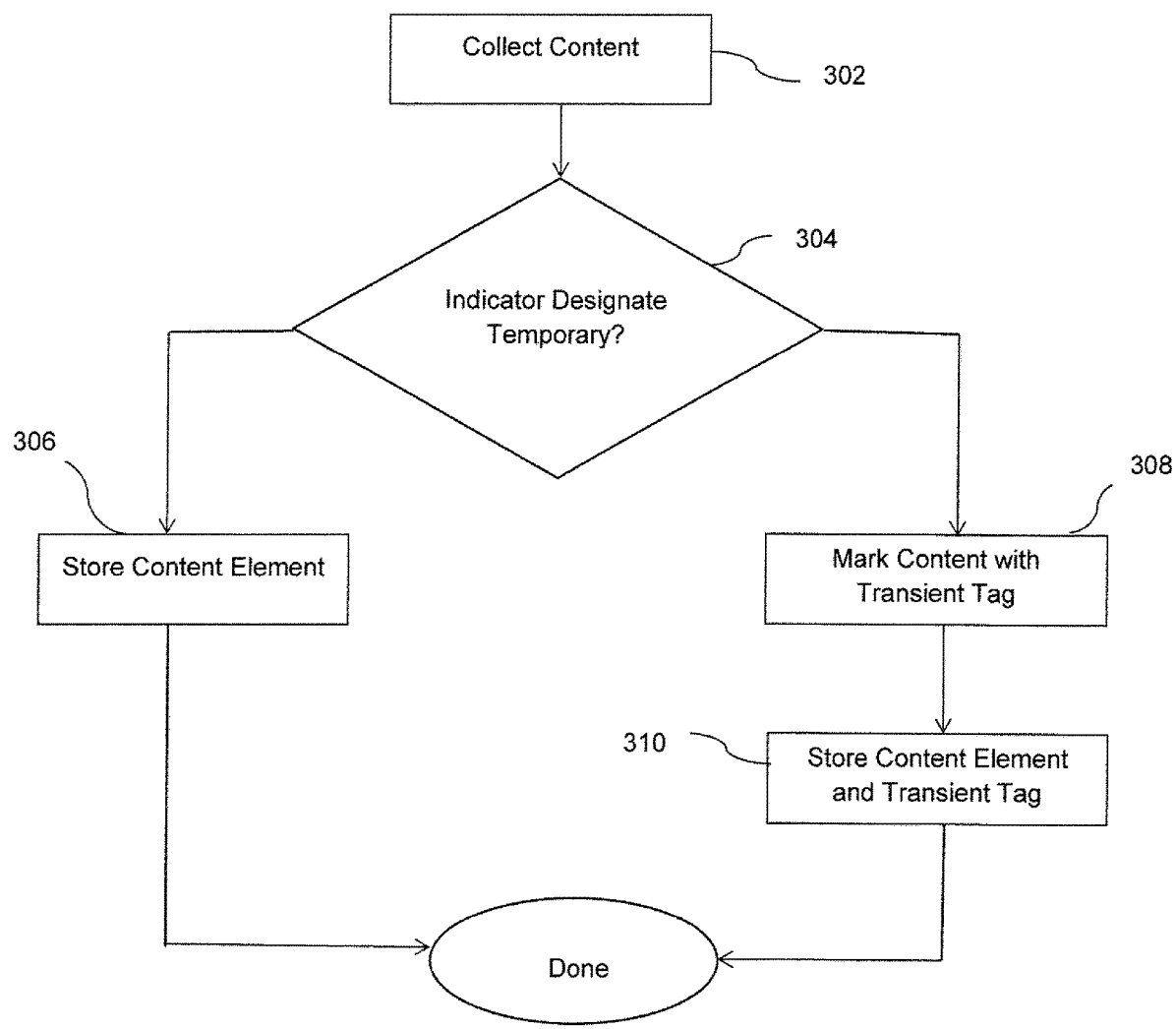
FIG. 3 illustrates a process for collecting content of interest in accordance with embodiments herein.

FIG. 3 illustrates a process carried out in accordance with embodiments for collecting content of interest. The operations of FIG. 3 are carried out by one or more processors 204 of the mobile device 110 in response to execution of program instructions, such as in the TCM application 224, and/or other applications stored in the local storage medium 206.

At 302, content of interest is collected by the mobile device 110 under user control. The user collected content of interest may include photographs, video recordings, and audio recordings, notes entered by a user and/or other content that may be entered into or captured by a mobile device 110 under user control. For example, a user may take photos on a mobile device 110. Alternatively or additionally, a user may use the mobile device 110 to record videos, record voice messages and/or conversations, enter notes or other information. The content of interest may be entered as a plurality of individual content elements, where each content element corresponds to one collection event. An individual photograph, video recording, or audio recording may represent a content element.

At 304, the processor determines whether an indicator has been received through a user interface of the mobile device 110. The indicator may designate at least a portion of the content to represent temporary content. The indicator represents a transient tag that may include a "lifetime marker" of the temporary content element in various manners.

The indicator may be entered before, during or after collection of the content element. For example, the user may capture a photo and then enter the indicator, through the user interface, to designate the photo as representing temporary content. Alternatively, the user may enter, through the user interface, an indicator that the next photo or next series of photos will represent temporary content elements. For example, before an adult provides their phone to a child, such as to take "selfies", the adult may enter an indicator to designate subsequent photos as temporary content. As another option, while a user is recording an audio or video recording, the user may enter, through the user interface, an indicator that the audio or video currently being recorded represents a temporary content element. Optionally, the indicator may be entered through the setup window of the mobile device 110 prior to content collection, such that, all photos, videos, audio memos and/or notes recorded while the temporary setting is ON, are designated as temporary content elements.

At 304, when an indicator is received, flow moves to 308. When an indicator is not received, flow moves to 306.

At 306, the content element or elements are stored in the local storage medium 206 as non-temporary content elements. When the mobile device 110 enters a content synchronization operation, the non-temporary content element(s) stored at 306 are made available/accessible for transfer to a remote storage medium, such as a cloud storage system.

Returning to 304, when an indicator is received, flow moves to 308. At 308, the content element is marked as a temporary content element. For example, the indicator may represent a transient tag that includes a time-based or temporal lifetime marker. For example, the temporal lifetime marker may designate an expiration date, such that, after expiration of the lifetime marker, the content element is to be deleted from the mobile device 110. The transient tag may be stored in the local storage medium 206 in a linked manner with the corresponding temporary content element(s). The transient tag and content element may be linked in various manners. For example, the transient tag may be stored in a field in a data file containing the content element. Alternatively or additionally, the transient tag may be appended as meta-data to the content element. Alternatively or additionally, the transient tag may be embedded within the data of the content element, such as applying a watermark to the content element, where the watermark includes the transient tag information (e.g., expiration data, GPS coordinates, etc.).

At 310, the content element or elements, and the indicator, are stored in the local storage medium 206 as a temporary content element(s). When the mobile device 110 enters a content synchronization operation, the temporary content element(s) stored at 310 are blocked, rendered unavailable/inaccessible or otherwise prevented from being transferred to a remote storage medium, such as the cloud hosting service 102. The operations at 302-310 are repeated each time the user collects content, such as taking pictures, recording audio/video, entering notes and/or the like.

Figure 4:
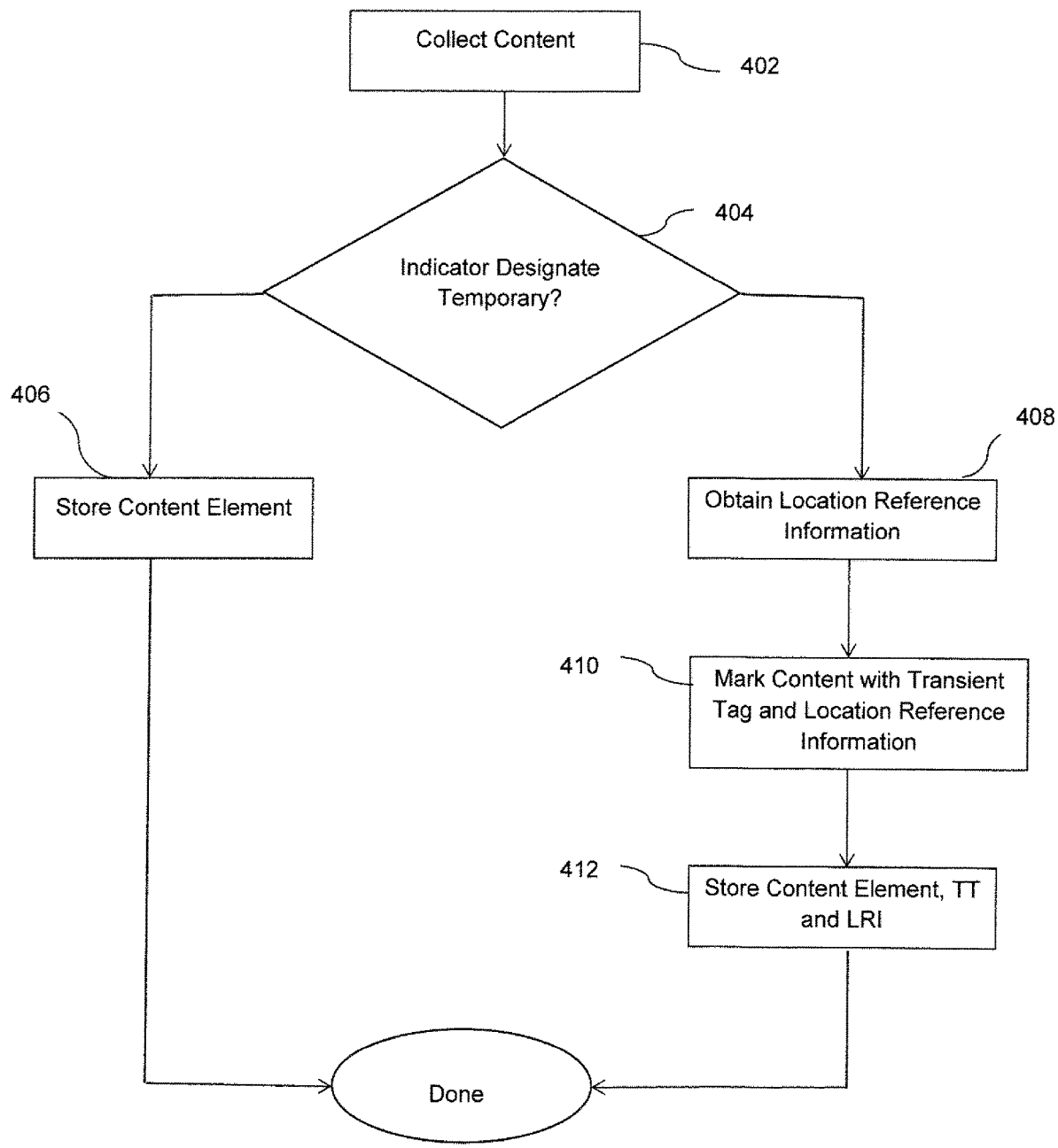
FIG. 4 illustrates a process for collecting content of interest in accordance with embodiments herein.

FIG. 4 illustrates a process carried out in accordance with an embodiment for collecting content of interest. The operations of FIG. 4 are carried out by one or more processors 204 of the mobile device 110 in response to execution of program instructions in the TCM application 224 and/or other applications stored in the local storage medium 206. At 402, content of interest is collected by a mobile device 110.

At 404, the process 204 determines whether an indicator has been received through a user interface of the mobile device 110 designating at least a portion of the content to represent temporary content. The indicator may represent a transient tag that includes a location-based or locational lifetime marker. As explained herein, a location-based lifetime for the temporary content element is managed based on relative change in location. When no indicator is received, flow moves to 406.

At 406, the content element or elements are stored in the local storage medium 206 as non-temporary content elements. When the mobile device 110 enters a content synchronization operation, the non-temporary content element(s), stored at 406, are made available/accessible for transfer to a remote storage medium, such as the cloud hosting service 102.

Returning to 404, when an indicator is entered designating the content element to be a temporary content element, flow moves to 408. At 408, the mobile device 110 obtains location reference information (LRI). For example, the mobile device 110 may collect GPS coordinates, a waypoint or other information, corresponding to the geographic location of the mobile device 110, at the time that the mobile device 110 collects the corresponding content element. For example, a user may want to remember where they parked a vehicle. The user may take a photograph of a location where the user's vehicle is parked and designate the photograph to be temporary. In this example, the processor 204 collects GPS coordinates corresponding to the location of the mobile device 110 (and the vehicle) when the photo is taken. The mobile device 110 may store in the configuration settings additional parameters related to GPS related location lifetime markers. For example, an additional parameter may be a retention distance, where the temporary content element is maintained at the mobile device 110 until the mobile device 110 moves the retention distance away from the originating GPS coordinates. For example, when the vehicle is at the mall, or other large parking area, the mobile device 110 would then delete the temporary content element when the vehicle leaves the mall or parking area.

Optionally, at 408, the LRI, that is obtained, may correspond to non-geographic information, such as one or more identifiers (IDs) for local wireless networks that are detectable by the transceiver 202. The LRI may also include signal strengths of the detected/recognized wireless networks. Additionally or alternatively, the LRI may correspond to cellular towers/networks (and/or cellular tower signal strengths) that are detected by the transceivers 202 at the time the content element is collected.

Additionally or alternatively, the LRI may represent a geo-fence, such as a dynamically generated radius around a store or point location. The geo-fence can represent a predefined or customized set of boundaries, like mall parking zones or neighborhood boundaries. When the mobile device 110 enters or exits a geo-fence, the mobile device 110 may generate or receive an externally generated notification. The notification may contain information about the current location of the mobile device 110. When using externally generated notifications, the geo-fence notice may be sent to as a test message, data, email account or otherwise. For example, a geo-fence (or other LRI configuration) may be used when a parent gives a phone to a child who then takes selfies and/or other photos while at a mall, family event, movie, entertainment event, at a parent's office. When the mobile device 110 leaves the geo-fence, radius of the LRI and/or the like, the processor 204 automatically deletes the selfies and/or other temporary content elements.

As in the process of FIG. 3, the indicator may be entered before, during or after collection of the content elements. For example, the user may capture a photo and then enter the location lifetime marker, such as by entering a waypoint designating the current location of the mobile device 110 at the time a photo is captured. Optionally, the location lifetime marker may be designated by the user upon entering an area or a situation where the user expects to capture temporary content elements.

Returning to FIG. 4, once the LRI is obtained, flow moves to 410. At 410, the content element is marked as a temporary content element. The content element may be marked in various manners, examples of which are explained in connection with FIG. 3, such as, but not limited to, adding the LRI to a field of the data file for the content element, and/or appending the LRI as meta-data or a watermark to the content element.

At 412, the content element or elements, the indicator (e.g., transient tag), and the LRI are stored in the local storage medium 206 as a temporary content element(s). When the mobile device 110 enters a content synchronization operation, the temporary content element(s) stored at 412 are blocked, rendered unavailable/inaccessible or otherwise prevented from being transferred to a remote storage medium, such as a cloud storage system.

After 406 and/or 412, the process of FIG. 4 is done. The operations at 402-412 are repeated each time the user collects content, such as taking pictures, recording audio/video, entering notes and/or the like.

Figure 5:
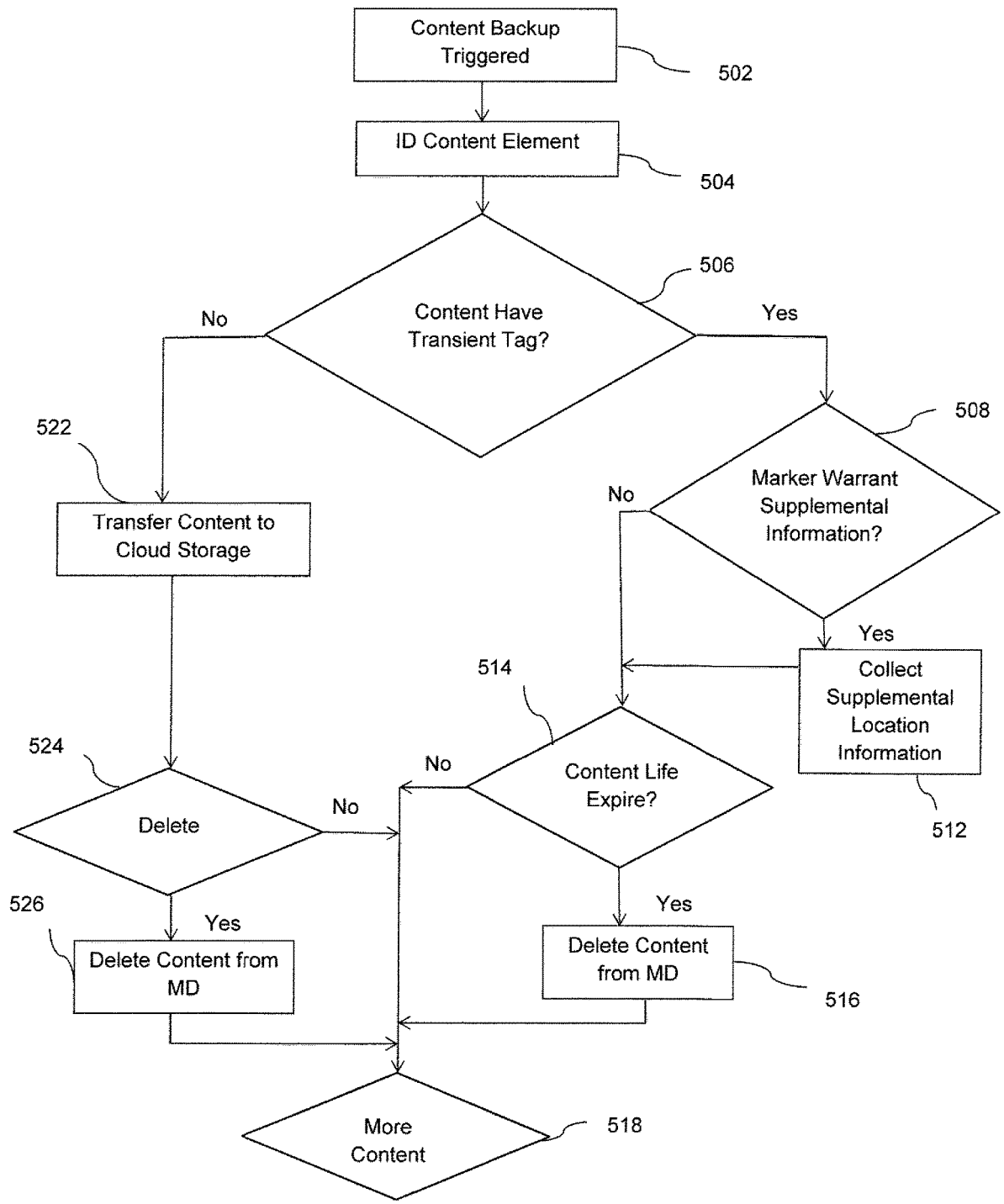
FIG. 5 illustrates a process for managing a cloud synchronization operation in accordance with embodiments herein.

FIG. 5 illustrates a process for managing a cloud synchronization operation in accordance with embodiments. The operations of FIG. 5 are carried out by one or more processors 204 of the mobile device 110 in response to execution of program instructions in the TCM application 224 and/or other applications stored in the local storage medium 206.

At 502, a trigger backup event occurs and is detected by the processor 204, in response to which the processor 204 initiates a content synchronization (CS) operation. The trigger backup event may represent connection to a local area network, detection of a hosting service 102, receipt of a communication (e.g., a request to sync, content pushed to the mobile device 110, etc.), time-out of a timer and/or the like. Other trigger events may occur that cause the mobile device 110 to initiate a CS operation. The CS operation may be limited to, or includes among other aspects, transfer of content from the mobile device 110 to the hosting service 102, and/or transfer of content from the hosting service 102 to the mobile device 110.

At 504, the processor 204 identifies a first/current (or multiple) content element that has not yet been transferred to the hosting service 102. The identification at 504 may be performed in various manners such as, but not limited to, based on meta-data, synchronization flags, hash values and the like. For example, the processor 204 may select a first/current content element and analyze meta-data, synchronization flags, watermarks, hash values and the like, for location and/or temporal lifetime markers. The operation at 504 may be performed individually upon separate content elements, or collectively upon multiple content elements as a group.

At 506, the processor 204 determines whether the current/first content element (or group of content elements) represents a temporary content element. The discrimination between temporary and non-temporary content elements is based on the existence or type of identifier (marker) linked to the corresponding content element. When the current content element has an identifier designating a temporary content element, flow moves to 508; otherwise flow moves to 512.

First, the operations are discussed in connection with performing cloud synchronization for non-temporary content elements. For non-temporary content elements, flow moves to 522. At 522, the transceivers 202 wireless transfer one or more non-temporary content elements over the Internet 106 to the hosting service 102. The operations at 522 for cloud synchronization of non-temporary content elements may be performed in accordance with various existing systems and procedures, such as the Google Drive™ file storage and synchronization service, the Dropbox™ file storage and synchronization service, the SkyDrive™ file storage and synchronization service and the like.

At 524, the processor 204 determines whether the non-temporary content element(s) should be deleted from the local storage medium 206 of the mobile device 110. If not, flow moves to 518. If so, flow moves to 526 where the processor 204 deletes the non-temporary content from the local storage medium 206.

Returning to 506, when one or more temporary content elements are identified, the operations at 522 are omitted entirely, thereby preventing or blocking transfer of the temporary content element(s) to the remote storage medium of the cloud hosting service 102. When identifiers are used to designate temporary content, but no lifetime markers are utilized, flow moves from 508 directly to 518.

Next, the operations at 508 to 516 are described in connection with embodiments in which identifiers for the temporary content elements include lifetime markers denoting an intended lifetime for the content. When a content element having an identifier with a lifetime marker is identified, flow moves to 508.

At 508, the processor 204 identifies and analyzes the appropriate meta-data, data field(s), flags, memory section, watermarks and/or source of lifetime markers associated with the content element. As explained above in connection with FIGS. 3 and 4, various types of identifiers may be used, such as location-based, time-based lifetime markers or otherwise. At 508, the processor 204 identifies whether the lifetime markers warrant collection of supplemental information before analyzing the lifetime marker. The use of supplemental information is determined, at least in part, based on the basis/nature of the lifetime marker(s). Various lifetime markers may utilize supplemental information when determining whether the lifetime marker has expired. For example, time-based lifetime markers may not utilize supplemental information as the temporal lifetime marker may have a date/time at which (or lifespan after which) the content element is to be deleted. Alternatively, location-based lifetime marker(s) may utilize supplemental information such as the present GPS coordinates of the mobile device 110, presently detectable LANs, cellular towers/networks, and/or the like. When the lifetime markers are to be analyzed with supplemental information, flow moves to 512. When the lifetime markers are to be analyzed without supplemental information, flow moves to 514.

At 512, the processor 204 obtains appropriate supplemental information. For example, when the lifetime markers are location-based, the transceiver 202 may obtain i) the present GPS coordinates of the mobile device 110, ii) presently detectable LANs, cellular towers/networks, and/or the like. Optionally, the operations at 508 and 512 may be omitted entirely when no lifetime markers are used that need supplemental information. For example, when only a time-based lifetime marker is used (e.g., a time stamp designating a deletion date), the operations at 508 and 512 may be omitted entirely.

At 514, the processor 204 determines whether the lifetime marker(s) have "expired". The lifetime marker, when time-based, may expire on a select date/time, expire after a select period of time following the time/date of origination (e.g., capture). The lifetime marker, when location-based, may expire when current location information diverges from origination location information in a predetermined manner that indicates that the location (at which the content element was captures) is no longer relevant or of interest. The expiration may be determined when the current GPS coordinates exceed a select distance from the origination GPS coordinates. The expiration may be determined when the current GPS coordinates exceed a select distance from reference GPS coordinates (e.g., an address or waypoint at a parking lot, mall, airport, etc.). The expiration may be determined when the current GPS coordinates fall outside a geo-fence. The expiration may be determined when one or more wireless networks that are detected/recognized by the mobile device 110 differ from one or more wireless networks that were detected/recognized by the mobile device 110 when the corresponding content element was collected. The expiration may be determined when a current signal strength of one or more wireless networks changes by more than a select level from a signal strength of the same wireless network(s) as measured by the mobile device 110 at the time when the corresponding content element was collected. The expiration may be determined when one or more current cellular towers/networks (and/or cellular tower signal strengths) differ from the cellular towers/networks (and/or differ by a select amount from the signal strengths) detected by the mobile device 110 at the time that the content element was collected.

Additionally or alternatively, when location-based temporary content elements are collected at intermediate term locations (e.g., when a user takes a photograph of a parking location at an airport garage before taking a flight), the operations as 512 and 514 may include collection and analysis of additional supplemental information. For example, it may be desirable to retain a photograph for an intermediate term location such as a parking location at the Chicago O'Hare airport, for a predetermined or pre-set period of time, such as the duration of time from when the user and mobile device 110 depart from and all arrive back at O'Hare airport. The supplemental information may be collected that enables the mobile device 110 to differentiate between when the user drives away from the airport, as opposed to flying out of the airport. For example, the wireless/GPS/cellular components of the mobile device 110 may identify rates of speed and/or a route taken, or periods of time wherein "airplane mode" followed by re-activation in a distant location, to differentiate air travel from a motor vehicle. Additionally or alternatively, the wireless/GPS/cellular components of the mobile device 110 may identify airport-related wireless networks, when location-based temporary content elements are captured, and hold the temporary content elements until determining that the mobile device 110 has returned to the original wireless network (e.g., upon detecting the O'Hare network at time of content collection, then searching for another airport or geographically remote network and then again detecting the O'Hare network several hours or one or more days later).

At 514, when a lifetime marker does not expire, flow moves to 518. When a lifetime marker does expire, flow moves to 516.

At 516, the temporary content element or elements is/are deleted from the local storage medium 206 of the mobile device 110. Alternatively or additionally, the temporary content elements) may be stored on another common user-controlled storage medium 206 instead of, or in addition to, the mobile device 110. For example, the other storage medium 206 may be operatively coupled to a desktop or laptop computer, a tablet device, or another smart phone that is commonly owned and controlled by the user of the mobile device 110 that is implementing the process of FIG. 5. In this example, the mobile device 110 may convey an instruction to the other common user-controlled device, such as a desktop or laptop computer, a tablet device, or another smart phone to instruct the other common user-controlled device to also delete the temporary content element(s) from the corresponding storage medium 206.

The operations at 506 to 516 prevent transfer, of the temporary content element(s), from the local storage medium 206 to the remote storage medium (e.g., the cloud hosting service 102) based on the indicators 222.

At 518, the mobile device 110 determines whether additional content elements are to be analyzed in connection with authorization for (or prevention from) cloud synchronization, and deletion from the local storage medium 206. When more content elements are to be analyzed, flow returns to 506. Otherwise, the process is done until the content download trigger event again occurs.

In accordance with the operations of FIG. 5, a cloud synchronization operation is performed in which the non-temporary content is transferred from the local storage medium 206 to the remote storage medium (e.g., the hosting service 102), and temporary content is prevented/blocked from transfer from the local storage medium 206 to the remote storage medium.

Optionally, when temporary content elements are stored in separate sections of memory, the determination at 506 may be based simply on the memory section in which the content elements are stored. For example, one section of memory may be designated as temporary storage, and a separate section designated for non-temporary storage. In this example, at 504, the processor 204 steps through each content element 218 in the temporary section of memory and processes the content elements in accordance with the operations at 508 to 516. Separately, the processor 204 steps through each content element 220 in the non-temporary section of memory and processes the content elements 220 in accordance with the operations at 522 to 526.

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
   collecting content at a mobile device based on user input to obtain user collected content;

receiving, through a user interface of the mobile device, an indicator designating one or more of i) a type of content, and ii) at least a portion of the user collected content previously collected, to represent temporary content, wherein a remainder of the user collected content, other than the temporary content, represents non-temporary content; and performing a synchronization operation with a remote backup storage medium of a hosting service, wherein the synchronization operation includes:

i) transferring the non-temporary content from a local storage medium of the mobile device to a remote backup storage medium of the hosting service; and ii) preventing transfer and storage of the temporary content on the remote backup storage medium of the hosting service based on the indicator, while maintaining the temporary content on the local storage medium of the mobile device.

2. The method of claim 1, further comprising deleting the temporary content from the local storage medium based on the indicator, after the synchronization operation prevented transfer and storage of the temporary content to the remote backup storage medium of the hosting service.

3. The method of claim 1, wherein the user collected content includes multiple user collected content elements, the indicator designating a corresponding one of the user collected content elements to be a temporary content element, further comprising storing the indicator in the local storage medium, the indicator linked with the corresponding temporary content element.

4. The method of claim 1, wherein the indicator includes a lifetime marker, the method further comprising deleting the temporary content, from the local storage medium, after expiration of the lifetime marker.

5. The method of claim 1, wherein the indicator includes a location marker, the method further comprising deleting the temporary content, from the local storage medium, based on a geographic location of the mobile device relative to the location marker.

6. The method of claim 1, wherein the indicator designates the type of content and the indicator is received before the user collected content is collected.

7. The method of claim 1, wherein the receiving includes one or more of:

selecting an input of the user interface of the mobile device;

selecting a trash icon on the user interface before collecting the temporary content;

selecting a content collection button on the user interface successive times;

entering a voice command;

holding down a content collection button for a predetermined period of time longer than a period of time associated with collection of non-temporary content; and entering predetermined non-touch gesture at the user interface associated with designation of the temporary content.

8. The method of claim 1, further comprising, following the synchronization operation, maintaining the temporary content in the local storage medium for a period of time and then deleting the temporary content.

9. The method of claim 1, wherein the user collected content represents one or more calls, contacts, calendar events, notes, task information, text messages, email messages, picture files, audio files, and/or video media files.

10. A device, comprising:
a processor;
an input that collects content based on user input to obtain user collected content;
a user interface;
a local storage medium storing program instructions accessible by the processor;
wherein, responsive to execution of the program instructions, the processor:

receives, through the user interface, an indicator designating one or more of i) a type of content, and ii) at least a portion of the user collected content previously collected, to represent temporary content, wherein a remainder of the user collected content, other than the temporary content, represents non-temporary content; and perform a synchronization operation with a remote backup storage medium of a hosting service, wherein the synchronization operation includes:

i) transferring the non-temporary content from a local storage medium of the device to a remote backup storage medium of the hosting service that does not store the temporary content; and ii) preventing transfer and storage of the temporary content on the remote backup storage medium of the hosting service based on the indicator, while maintaining the temporary content on the local storage medium of the device.

11. The device of claim 10, wherein the user interface comprises one or more of the following that is selectable to enter the indicator:

i) an input;

ii) a trash icon on the user interface to be selected before collecting the temporary content;

iii) a content collection button on the user interface to be selected successive times;

iv) a microphone to enter a voice command;

v) a content collection button to be held for a predetermined period of time longer than a period of time associated with collection of non-temporary content; and vi) a touch sensitive display sensitive to a predetermined non-touch gesture associated with designation of the temporary content.

12. The device of claim 10, wherein the input collects the content from a source separate from the hosting service.

13. The device of claim 10, wherein the synchronization operation represents a cloud synchronization operation that blocks the temporary content from being backed up on the remote backup storage medium of the hosting service.

14. The device of claim 10, wherein the local storage medium stores, as the indicator, a lifetime marker, the processor configured to delete the temporary content, from the local storage medium, after expiration of the lifetime marker.

15. The device of claim 14, wherein the lifetime marker represents a location-based lifetime marker, the processor configured to delete the temporary content, from the local storage medium, based on a geographic location of the mobile device relative to an origination location, at which the temporary content was collected.

16. The device of claim 10, wherein the local storage medium includes a first section of memory designated as temporary storage, and a separate second section of memory designated for non-temporary storage, the processor configured to transfer the content in the non-temporary storage to the remote backup storage medium of the hosting service and to determine whether to delete individual content elements in the temporary section.

17. The device of claim 10, wherein, responsive to execution of the program instructions, the processor to maintain the temporary content in the local storage medium, following the synchronization operation, for a period of time and then delete the temporary content.

18. The device of claim 10, wherein the user collected content represents one or more calls, contacts, calendar events, notes, task information, text messages, email messages, picture files, audio files, and/or video media files.

19. A computer program product comprising a non-transitory computer readable storage medium comprising computer executable code to perform:
  collecting content at a mobile device from a source separate from a remote backup storage medium of a hosting service based on user input to obtain user collected content;
  receiving, through a user interface of the mobile device, an indicator designating one or more of i) a type of content, and ii) at least a portion of the user collected content previously collected, to represent temporary content, wherein a remainder of the content, other than the temporary content, represents non-temporary content; and
  performing a synchronization operation with a remote backup storage medium of the hosting service, wherein the synchronization operation includes:
    i) transferring the non-temporary content from a local storage medium to the remote backup storage medium of the hosting service; and
    ii) preventing transfer and storage of the temporary content on the remote backup storage medium of the hosting service based on the indicator, while maintaining the temporary content on the local storage medium of the mobile device.

20. The computer program product of claim 19, the code further comprising permitting a cloud synchronization operation as the synchronization operation that blocks the temporary content from being stored on the remote backup storage medium of the hosting service that does not already store the temporary content.

21. The computer program product of claim 19, further comprising deleting the temporary content, from the local storage medium, based on the indicator after preventing the storage of the temporary content to the remote backup storage medium of the hosting service.

22. The computer program product of claim 19, wherein the receiving operation includes one or more of:
  selecting an input of the user interface of the mobile device;
  selecting a trash icon on the user interface before collecting the temporary content;
  selecting a content collection button on the user interface successive times;
  entering a voice command;
  holding down a content collection button for a predetermined period of time longer than a period of time associated with collection of non-temporary content; and
  entering predetermined non-touch gesture at the user interface associated with designation of the temporary content.

23. The computer program product of claim 19, wherein the receiving operation includes: following the synchronization operation, maintaining the temporary content in the local storage medium for a period of time and then deleting the temporary content.

24. The computer program product of claim 19, wherein the user collected content represents one or more calls, contacts, calendar events, notes, task information, text messages, email messages, picture files, audio files, and/or video media files.

* * * * *